United States Patent
VanSickle

(10) Patent No.: US 6,938,955 B2
(45) Date of Patent: Sep. 6, 2005

(54) POWER LUMBAR MECHANISM

(75) Inventor: James R. VanSickle, New Baltimore, MI (US)

(73) Assignee: L&P Property Management Co., South Gate, CA (US)

( * ) Notice: Subject to any disclaimer, the term of this patent is extended or adjusted under 35 U.S.C. 154(b) by 85 days.

(21) Appl. No.: 10/268,446

(22) Filed: Oct. 10, 2002

(65) Prior Publication Data
US 2004/0075319 A1 Apr. 22, 2004

Related U.S. Application Data

(60) Provisional application No. 60/343,073, filed on Dec. 20, 2001, and provisional application No. 60/328,561, filed on Oct. 11, 2001.

(51) Int. Cl.[7] .............................. A47C 7/14; A47C 7/46
(52) U.S. Cl. ............................... 297/284.4; 297/284.2; 297/284.7
(58) Field of Search ........................... 297/284.4, 284.2, 297/284.7

(56) References Cited

U.S. PATENT DOCUMENTS

| | | | |
|---|---|---|---|
| 2,756,809 A | 7/1956 | Endresen | 155/182 |
| 2,843,195 A | 7/1958 | Barvaeus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,724,144 A | 4/1973 | Schuster | 52/108 |
| 3,762,769 A | 10/1973 | Poschl | 297/284 |
| 4,136,577 A | 1/1979 | Borgersen | 74/479 |
| 4,153,293 A | 5/1979 | Sheldon | 297/284 |
| 4,156,544 A | 5/1979 | Swenson et al. | 297/284 |
| 4,182,533 A | 1/1980 | Arndt et al. | 297/284 |
| 4,295,681 A | 10/1981 | Gregory | 297/284 |

(Continued)

Primary Examiner—Rodney B. White
(74) Attorney, Agent, or Firm—Grant D. Kang; Dennis J. M. Donahue, III; Rebecca J. Brandau

(57) ABSTRACT

A powered lumbar support mechanism includes a lumbar plate having a power mechanism having connecting links connected to opposite ends of the plate. One of the connecting links is longitudinally movable to change the convexity of the outer surface of the plate to adjust the lumbar support. The power mechanism includes a housing which retains a threaded rod threaded into a worm gear mechanism held within the housing. The housing also retains a motor having a worm which drives the threaded worm gear. The housing can also incorporate a second threaded rod, threaded to a second threaded worm gear also fixed within the housing such that the end of the second threaded rod is connected to a seat support so as to allow for the adjustability of the vertical position of the lumbar mechanism.

42 Claims, 13 Drawing Sheets

U.S. PATENT DOCUMENTS

| | | | |
|---|---|---|---|
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,390,210 A | 6/1983 | Wisniewski et al. | 297/452 |
| 4,449,751 A | 5/1984 | Murphy et al. | 297/284 |
| 4,452,485 A | 6/1984 | Schuster | 297/284 |
| 4,465,317 A | 8/1984 | Schwarz | 297/284 |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,564,235 A | 1/1986 | Hatsutta et al. | 297/284 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,627,661 A | 12/1986 | Ronnhult et al. | 297/284 |
| 4,630,865 A | 12/1986 | Ahs | 297/284 |
| 4,632,454 A | 12/1986 | Naert | 297/284 |
| 4,676,550 A | 6/1987 | Neve De Mevergnies | 297/353 |
| 4,679,848 A | 7/1987 | Spierings | 297/284 |
| 4,730,871 A | 3/1988 | Sheldon | 297/230 |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 5,005,904 A | 4/1991 | Clemens et al. | 297/284 |
| 5,022,709 A | 6/1991 | Marchino | 297/452 |
| 5,026,116 A | 6/1991 | Dal Monte | 297/284 |
| 5,050,930 A | 9/1991 | Schuster et al. | 257/284 |
| 5,076,643 A | 12/1991 | Colasanti et al. | 297/284 |
| 5,088,790 A | 2/1992 | Wainwright et al. | 297/284 |
| 5,137,329 A | 8/1992 | Neale | 297/284 |
| 5,174,526 A | 12/1992 | Kanigowski | 244/122 |
| 5,197,780 A | 3/1993 | Coughlin | 297/284.7 |
| 5,215,350 A | 6/1993 | Kato | 297/284.4 |
| 5,217,278 A | 6/1993 | Harrison et al. | 297/284.7 |
| 5,286,087 A | 2/1994 | Elton | 297/284.7 |
| 5,299,851 A | 4/1994 | Lin | 297/284.5 |
| 5,335,965 A | 8/1994 | Sessini | 297/284.4 |
| 5,385,531 A | 1/1995 | Jover | 601/99 |
| 5,397,164 A | 3/1995 | Schuster | 297/284.1 |
| 5,423,593 A | 6/1995 | Nagashima | 297/284.4 |
| 5,449,219 A | 9/1995 | Hay et al. | 297/284.4 |
| 5,452,868 A | 9/1995 | Kanigowski | 244/122 R |
| 5,474,358 A | 12/1995 | Maeyaert | 297/284.7 |
| 5,498,063 A | 3/1996 | Schuster et al. | 297/284.1 |
| 5,518,294 A | 5/1996 | Ligon, Sr. et al. | 297/284.4 |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,588,703 A | 12/1996 | Itou | 297/284.4 |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,704,687 A | 1/1998 | Klingler | 297/284.4 |
| 5,718,476 A | 2/1998 | De Pascal et al. | 297/284.4 |
| 5,758,925 A | 6/1998 | Venuto et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A | 8/1998 | Van Hekken et al. | 297/284.4 |
| 5,816,653 A | 10/1998 | Benson | 297/284.4 |
| 5,823,620 A | 10/1998 | Le Caz | 297/284.4 |
| 5,857,743 A | 1/1999 | Ligon, Sr. et al. | 297/284.9 |
| 5,868,466 A | 2/1999 | Massara et al. | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |
| 6,036,265 A | 3/2000 | Cosentino | 297/284.4 |
| 6,045,185 A | 4/2000 | Ligon, Sr. et al. | 297/284.4 |
| 6,050,641 A | 4/2000 | Benson | 297/284.4 |
| 6,055,877 A * | 5/2000 | Welterlin et al. | 248/429 |
| 6,079,783 A | 6/2000 | Schuster, Sr. et al. | 297/284.4 |
| 6,092,871 A | 7/2000 | Beaulieu | 297/284.4 |
| 6,152,531 A | 11/2000 | Deceuninck | 297/284.4 |
| 6,152,532 A | 11/2000 | Cosentino | 297/284.4 |
| 6,158,300 A | 12/2000 | Klingler | 74/526 |
| 6,227,617 B1 | 5/2001 | Von Möller | 297/284.4 |
| 6,227,618 B1 | 5/2001 | Ligon, Sr. et al. | 297/284.4 |
| 6,254,186 B1 | 7/2001 | Falzon | 297/284 |
| 6,254,187 B1 | 7/2001 | Schuster, Sr. et al. | 297/284.1 |
| 6,270,158 B1 | 8/2001 | Hong | 297/284.4 |
| 6,296,308 B1 | 10/2001 | Cosentino et al. | 297/284.4 |
| 6,334,651 B1 | 1/2002 | Duan et al. | 297/284.4 |
| 6,431,648 B1 * | 8/2002 | Cosentino et al. | 297/284.4 |
| 6,616,227 B2 * | 9/2003 | Blendea et al. | 297/284.4 |
| 6,631,951 B2 * | 10/2003 | Blendea et al. | 297/284.4 |
| 2002/0113471 A1 | 8/2002 | Blendea et al. | 297/284.4 |

FOREIGN PATENT DOCUMENTS

| | | | |
|---|---|---|---|
| AT | 401 497 | 9/1996 | B60N/2/22 |
| DE | 2040794 | 7/1971 | A47C/7/28 |
| DE | 206 4419 | 7/1972 | B60N/1/06 |
| DE | 29 47 472 | 8/1981 | B60N/1/00 |
| EP | 0 006 840 B1 | 2/1982 | A47C/23/00 |
| EP | 0 169 293 B1 | 10/1988 | A47C/7/46 |
| EP | 0 322 535 A1 | 7/1989 | A47C/7/46 |
| EP | 0 485 483 B1 | 1/1994 | A47C/7/46 |
| EP | 0 434 660 B1 | 5/1995 | A47C/7/46 |
| EP | 0 540 481 B1 | 12/1995 | A47C/7/46 |
| EP | 0 662 795 B1 | 12/1996 | A47C/7/46 |
| EP | 0 702 522 B1 | 3/1997 | A47C/7/46 |
| EP | 0 696 251 B1 | 7/1997 | B60N/2/44 |
| EP | 0 746 219 B1 | 11/1998 | A47C/7/46 |
| EP | 0 797 399 b1 | 11/1998 | A47C/7/46 |
| EP | 0 698 360 B1 | 3/2000 | A47C/7/46 |
| FR | 2 596 334 | 10/1987 | B60N/1/06 |
| GB | 1 423 617 | 2/1976 | A47C/7/46 |
| GB | 2 013 487 | 2/1978 | A47C/7/46 |
| RU | 587924 | 2/1978 | A47C/7/46 |
| WO | WO/00/00064 | 1/2000 | A47C/3/025 |

* cited by examiner

US 6,938,955 B2

POWER LUMBAR MECHANISM

This application claims the benefit of U.S. Provisional Patent Application Ser. Nos. 60/343,073 filed Dec. 20, 2001, and No. 60/328,561 filed Oct. 11, 2001, the complete disclosure of which is hereby expressly incorporated by reference.

FIELD OF THE INVENTION

The invention relates to a powered lumbar support system for a seat back, where both the convexity and position of the lumbar support within the seat can be adjusted.

BACKGROUND OF THE INVENTION

Many different types of lumbar contour mechanisms are provided, both in a manual and power version. One such manual version is shown in U.S. Pat. No. 5,775,773, which shows a plurality of horizontally extending lumbar members which are attached to transversely spaced vertical holding mechanisms, whereby the vertical holding mechanisms can be bowden from top to bottom by way of a linkage, together with a bowden cable which, when shortened, changes the convexity of the lumbar mechanism. As the lumbar mechanism is positioned in a seat back, the seat back also conforms to the shape of the lumbar contour mechanism and therefore changes the contour of the seat back. Typically a manual handle is connected to the opposite end of the bowden cable and is routed to a position, for example, either adjacent an edge of the seat back or an edge of the seat bottom, whereby rotation of the handle causes the convexity of the contour mechanism.

Power versions also are provided, where the convexity is changed by way of a power system of sorts, such as an electric motor, which also forms a bowing or convexity to a lumbar mechanism. It is also common to have both a two-way mechanism, that is, where the mechanism is movable in two contour directions, that is, to increase and/or decrease the convexity, as well as a four-way power lumbar system, that is, where the convexity of the lumbar mechanism can be changed in both directions, as well as the actual vertical position of the lumbar mechanism itself relative to the seat back can be changed in two directions.

Various different designs exist for such a device. First, some designs have air bladders which inflate to provide an enlarged volume at the lumbar to support the person's back. Other designs include a flexible plate, whereby the ends of the plate can be moved together to change the convexity of the plate and thereby change the convexity of the seat back.

One such design for a deformable plate is shown in U.S. Pat. Nos. 5,335,965 and 5,567,011 (incorporated herein by reference). Such a plate is shown where a pair of threaded rods are threaded into a cylindrical scroll such that turning the scroll threads the threaded rods into and out of the scroll. Numerous shortcomings exist with this prior design. First, as the threaded rods thread into both ends, the amount of change in elongation of the threaded rods is limited by somewhat less than the length of the cylindrical scroll, as the threaded rods will thread into the scroll and abut at the minimum position, and some thread length must be left in the scroll to hold the rods. Secondly, this also requires that the torque on the scroll be relatively high as two rods are being threaded into the scroll at the same time. Thus, the power required to turn the scroll is also relatively high in the case of a powered lumbar because the linear displacement over time is twice that of a single rod. Nor is it satisfactory to simply change the thread size of the threaded rods so as to decrease the linear displacement over time, as the threaded rods are preferably of a molded plastic material and therefore small threads could not withstand the force on the plastic threads. Finally, as designed, it is difficult to provide a power source to the central scroll as it is intended for the scroll to turn relative to the threaded rods, and torque applied to the scroll causes a moment in the opposite direction as well.

The objects of the invention are therefore to overcome the shortcomings and impediments of the prior art device.

SUMMARY OF THE INVENTION

The objects of the invention have been accomplished by providing a powered lumbar mechanism comprised of a plate having an outer contact surface and an inner surface, side edges and end edges. A housing mechanism has an interior and opposite ends. Connecting links are positioned adjacent the opposite ends, whereby at least one of the connecting links is a movable link extending into the interior of the housing mechanism. The connecting links are attached to the plate end edges, suspendably extending the housing mechanism between the plate end edges. The housing retains a power assembly for effecting movement of the movable link, whereby the plate is deformable to a curvilinear shape of varying radii of curvature.

In the preferred embodiment of the invention, the movable link has a drive end which extends through an opening in one end of the housing, and the power assembly comprises a cooperable drive mechanism positioned within the housing and in driving engagement with the drive end. The drive end is preferably comprised of a threaded rod. The cooperable drive mechanism is comprised of an internally threaded worm gear, cooperatively threaded on the threaded rod. The worm gear is further comprised of an externally geared section. The power assembly is further comprised of a motor mounted to the housing, having a drive shaft and a drive gear cooperable with the externally geared section of the worm gear. The drive gear is preferably a worm. The housing includes a motor mounting flange to mount the drive shaft and the drive gear, substantially transverse to the movable link. Also preferably, the housing mechanism is comprised of bipartite housing halves, which together form the interior, the housing halves each including a molded bearing section, which form a bearing for rotatably mounting the spool thereon.

Also in the preferred embodiment of the invention, the other connecting link is fixed to the housing mechanism. The plate includes trunnions at the end edges and the connecting links include rod ends receivable in the trunnions.

In another embodiment of the invention, a powered lumbar mechanism for placement within a seat back comprises a plate mechanism having an outer contact surface and an inner surface, side edges and end edges. A housing mechanism is included having a longitudinal interior compartment extending between opposite ends thereof, the housing mechanism being attached to a first end edge of the plate mechanism. A movable connecting link is attached to the housing mechanism, and comprises a drive end extending within the longitudinal interior compartment, and a connection end extending from the housing mechanism and connected to a second and opposite end edge of the plate mechanism. A power drive mechanism is attached to the housing mechanism, and drivingly engages the drive end. In this manner, the movable connecting link is longitudinally movable within the longitudinal interior compartment whereby the plate mechanism can define a curvilinear lumbar support plate within the seatback having varying radii of curvature.

In the preferred version of this embodiment, the housing mechanism includes side by side longitudinal interior compartments, and a second movable link is positioned within a second longitudinal interior compartment, the second movable connecting link comprising a drive end extending within the longitudinal interior compartment, and an opposite end extending from the housing and beyond an end edge of the plate; and a second power drive mechanism, attached to the housing, and drivingly engaging the drive end of the second movable connecting link, whereby the opposite end of the second movable connecting link can be attached to a fixed point within the seatback, to move the location of the plate relative to the seatback.

Preferably, the movable links extend from opposite ends of the housing. The power drive mechanism comprises cooperable drive mechanisms positioned within the housing and in engagement with the drive ends of the movable links. The drive ends are comprised of threaded rods. The cooperable drive mechanisms are comprised of internally threaded worm gears, cooperatively threaded on the threaded rods. The worm gears further comprise externally geared sections. The power drive mechanisms further comprise motors mounted to the housing, having drive shafts and drive gears cooperable with the externally geared sections of the worm gears. The drive gear is preferably a worm. The housing mechanism includes a motor mounting flange to mount the drive shaft and the drive gear, substantially transverse to the longitudinal interior compartment.

Also preferably, the housing mechanism is comprised of bipartite housing halves, which together form the interior, the housing halves each including a molded bearing section, which form a bearing for rotatably mounting the spool thereon.

In yet another embodiment of the invention, a seat assembly having a powered lumbar adjustment within a seat back comprises a seat, having a seat bottom and a seat back, where the seat back has vertically extending rod members, and at least one horizontally extending support rod member. A powered lumbar mechanism comprises a curvilinear plate slidably attached to the vertically extending rod members, and a drive mechanism positioned between opposite vertical ends of the plate. The drive mechanism has a housing attached at a first vertical end of the plate and a movable link is connected to the housing and connected to a second vertical end of the plate. A power drive mechanism, attached to the housing drivingly engages the movable link, to move the movable link into and out of the housing. In this manner, the power drive mechanism is operable to move the movable link to define the curvilinear plate within the seatback having varying radii of curvature.

Preferably, the movable link is movably attached to the housing, and comprises a drive end extending within a first longitudinal interior compartment of the housing mechanism. The housing includes side by side longitudinal interior compartments, and a second movable link is positioned within a second longitudinal interior compartment. The second movable connecting link comprises a drive end extending within the second longitudinal interior compartment, and an opposite end extends from the housing, beyond an end edge of the plate, and is attached to the horizontally extending support member. A second power drive mechanism, attached to the housing, drivingly engages the drive end of the second movable connecting link, whereby the second power drive mechanism can be actuated to move the vertical location of the plate relative to the seatback.

Also preferably, the movable links extend from opposite ends of the housing. The first and second power drive mechanisms comprise cooperable drive mechanisms positioned within the housing and in engagement with the drive ends of the movable links. The drive ends are comprised of threaded rods. The cooperable drive mechanisms are comprised of internally threaded worm gears, cooperatively threaded on the threaded rods. The spools further comprise externally geared sections. The first and second power drive mechanisms further comprise motors mounted to the housing, having drive shafts and drive gears cooperable with the externally geared sections of the worm gears. In the preferred embodiment of the invention, the drive gears are worms. The housing includes motor mounting flanges to mount the drive shafts and the drive gears, substantially transverse to the first and second longitudinal interior compartments. The housing is comprised of bipartite housing halves, which together form the interior, the housing halves each including molded bearing sections, which form bearings for rotatably mounting the worm gears therein.

In a final embodiment of the invention, a power lumbar mechanism comprises a lumbar plate deformable to various convex positions, a drive mechanism extending between opposite ends of the lumbar plate, having various longitudinal positions to vary the lumbar plate convexity. The drive mechanism is comprised of a motor unit, a drive nut, and a threaded rod. The mechanism further comprises a sensing mechanism to count the number of rotations of the drive nut, in order that exact positioning is known.

In the preferred embodiment of this version, the drive unit is further comprised of a worm driven by the motor, and the worm in turn driving the drive nut, the drive nut having internal threads which threadably engage the threaded rod to drive the rod, to extend and retract the rod, and thereby change the convexity of the lumbar plate.

Preferably, the sensing unit is comprised of a light emitting member and a light detecting member. The drive nut preferably includes at least one aperture therethrough, and the light emitting member and the light detecting member are positioned on opposites sides of the aperture, to emit light and receive light, through the apertures, whereby the rotational movement of the drive nut can be counted. The mechanism also preferably comprises a memory means to memorize the position of the drive nut.

DETAILED DESCRIPTION OF THE PREFERRED EMBODIMENT

Figure 1:
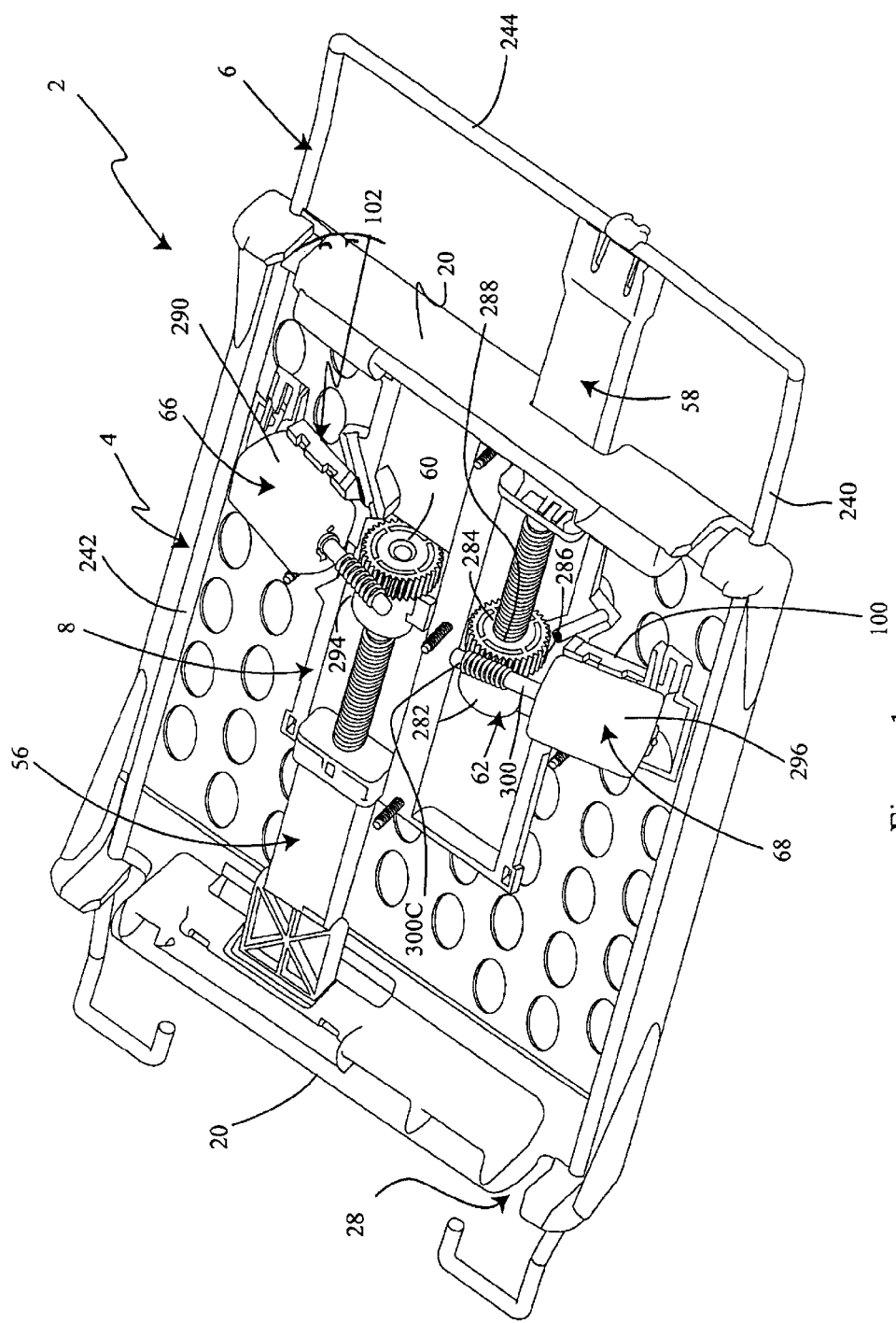
FIG. 1 is a perspective view of the entire lumbar support assembly from the underside without the top housing cover.
Figure 2:
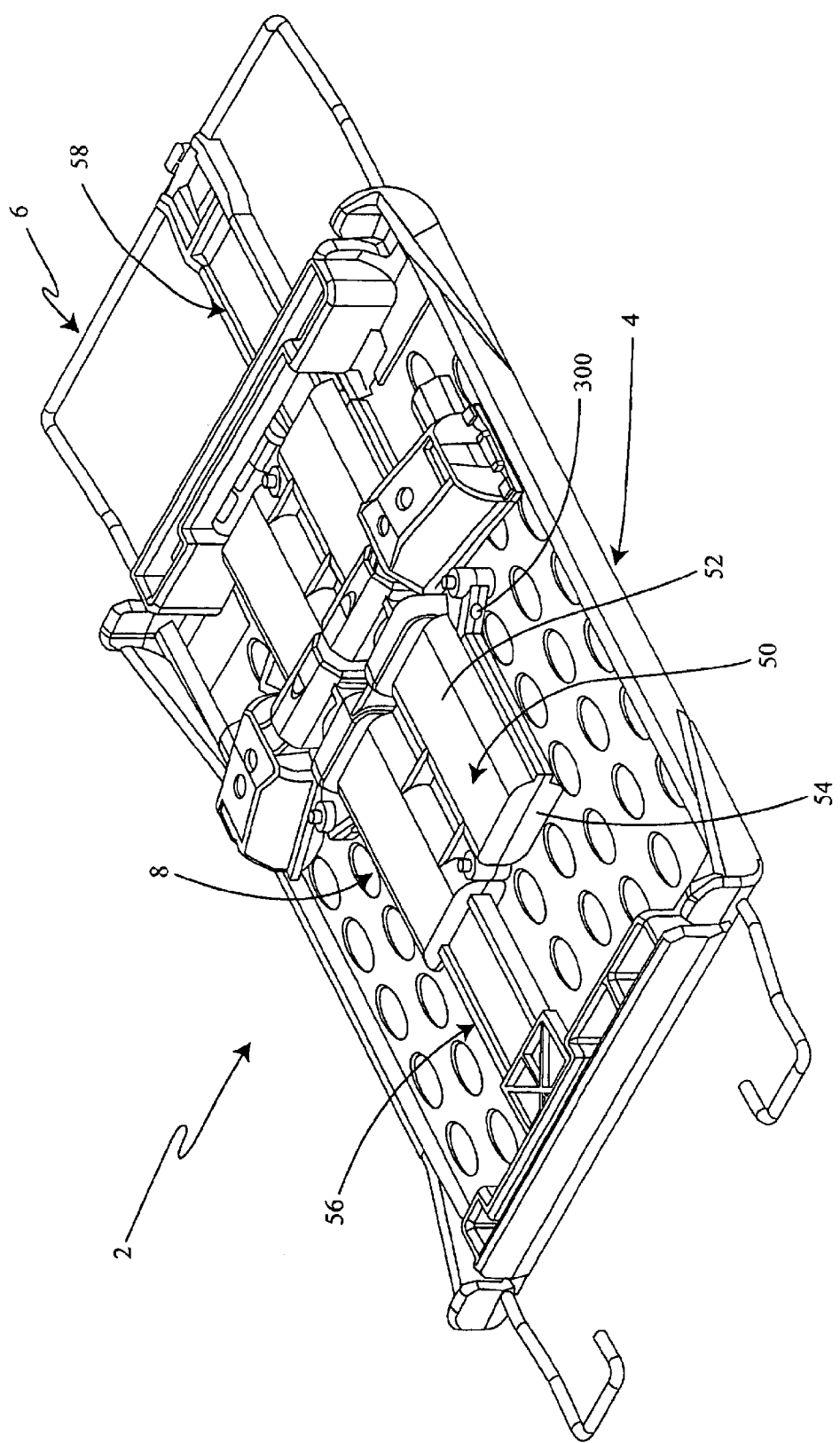
FIG. 2 is a view similar to that of FIG. 1 showing the complete assembly including the top housing cover.

With respect first to FIGS. 1 and 2, the power lumbar mechanism is shown generally as reference numeral 2 including a curvilinear plate 4, slidably attached to support structure 6 within the seat back of a seat, with a drive mechanism 8 for effecting the change in curvature of curvilinear plate 4 as well as the location of the plate 4 relative to support structure 6.

Figure 3:
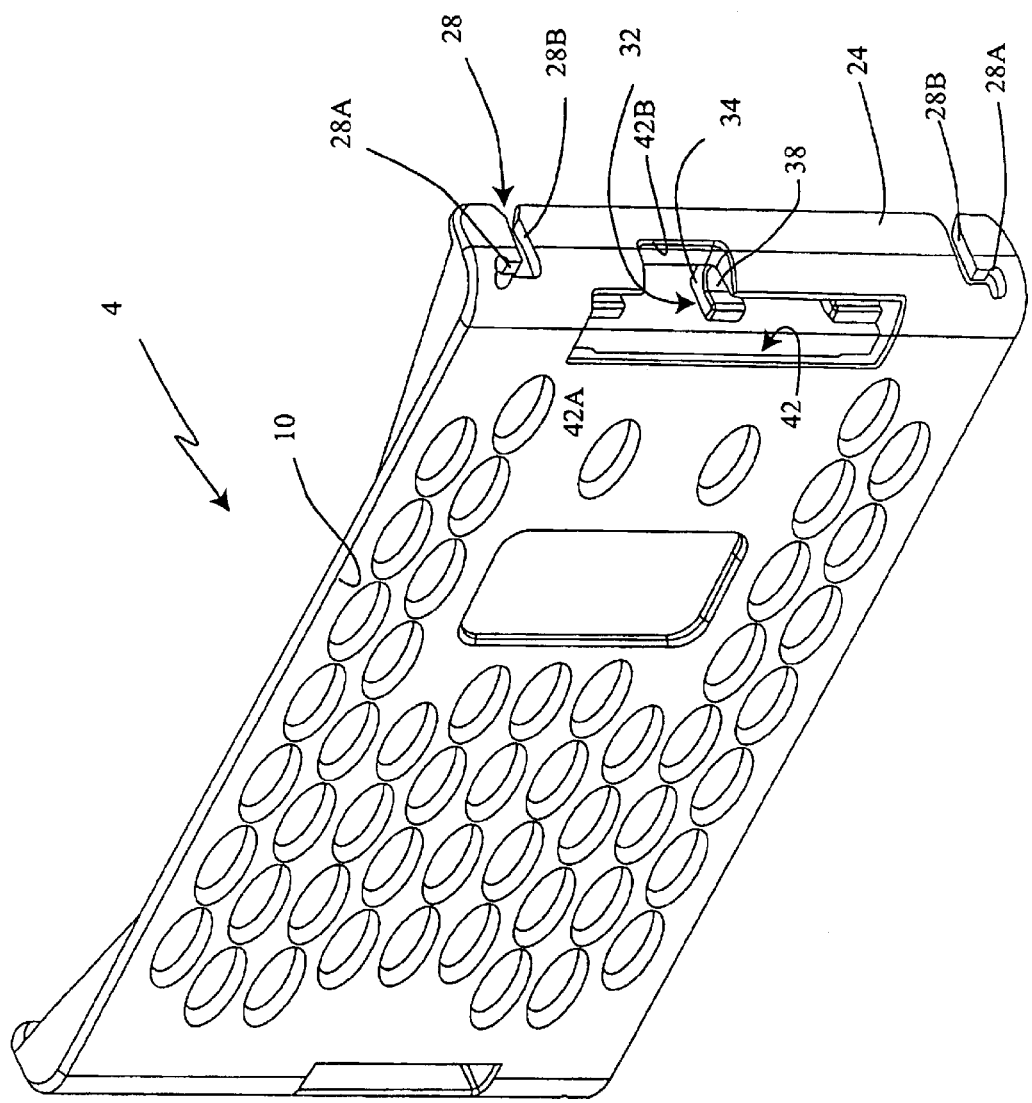
FIG. 3 is a front perspective view of the lumbar plate only.
Figure 4:
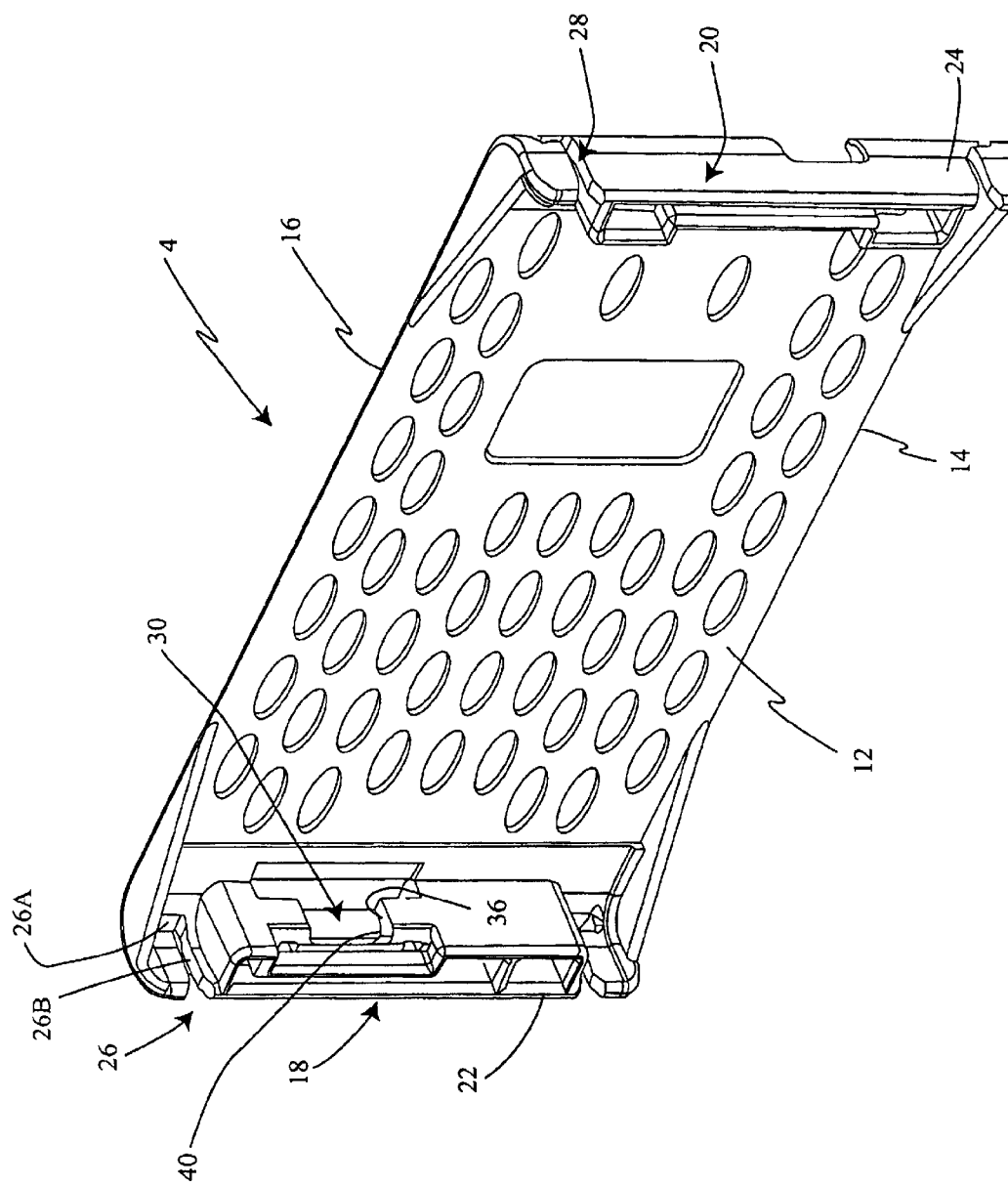
FIG. 4 is a rear perspective view of the lumbar plate only.

With reference now to FIGS. 3 and 4, curvilinear plate will be described in greater detail as including an outer contact surface 10, an inner surface 12, side edges 14, 16, and end edges 18, 20. End edges 18 and 20 include an upstanding lip 22, 24, where each lip includes L-shaped slots 26 and 28. The L-shaped slots include horizontal slot sections 26A, 28A, and vertically extending slot sections 26B, 28B. Each end 18, 20 further includes a trunnion section 30, 32, where each includes an open slot section 34, 36, and a recessed channel section 38, 40 as will be described in greater detail. Furthermore, as shown in FIG. 3, plate 4 includes a T-shaped slot 42, adjacent to end edge 20, having sections 42A and 42B.

Figure 5:
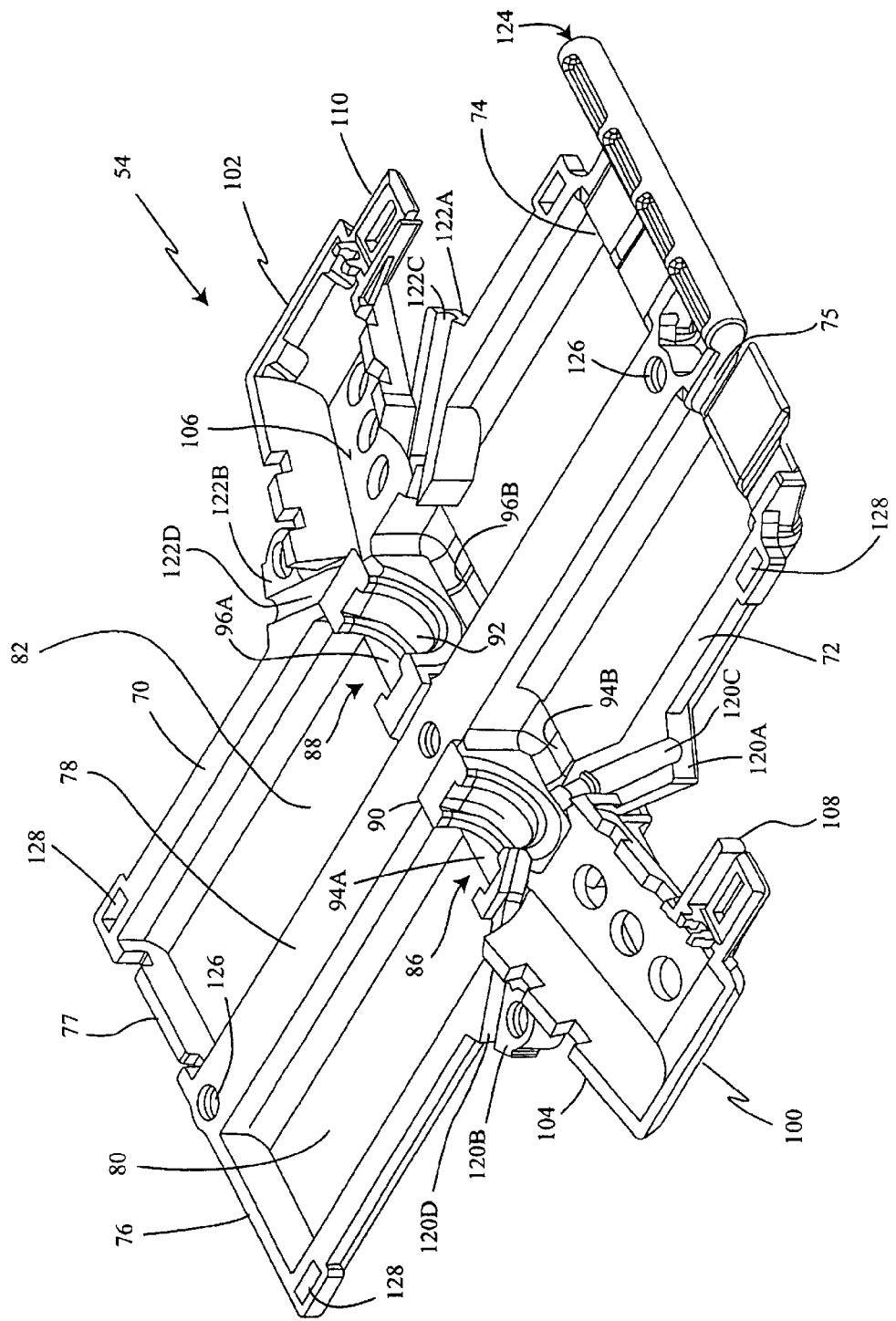
FIG. 5 is a perspective view of the inside of the lower housing member.

With reference again to FIGS. 1 and 2, the power drive mechanism 8 is comprised of a housing mechanism 50, having of an upper housing member 52 and a lower housing member 54. The power drive mechanism further includes movable link members 56 and 58, worm gear members 60 and 62, and motor drive units 66 and 68. With reference now to FIG. 5, the lower housing 54 will be described in greater detail.

Lower housing member 54 is preferably a molded plastic component including marginal surfaces including side surfaces 70 and 72, and end walls 74, 76. End wall 74 has an open channel at 75, and end wall 76 has an open channel at 77. A center wall 78 separates housing 54 into two longitudinal interior compartments 80 and 82, which extend between end edges 74 and 76. As also shown in FIG. 5, bearing sections 86 and 88 are included, having molded semi-cylindrical bearing sections 90 and 92, having clearance slots 94A, 94B; 96A, 96B flanking respective bearing sections 90, 92, as will be described further herein. Furthermore, housing section 54 includes extensions 100, 102, having mounting surfaces 104, 106 with terminal connection sections 108, 110. Housing member 54 further includes platform extensions 120A, 120B and 122A, 122B, having channels 120C, 120D; 122C, 122D. An axle 124, of generally cylindrical configuration, extends from end wall 74 as described further herein. Finally, housing 54 includes a plurality of fastener openings 126, and a plurality of latch receiving openings 128.

Figure 6:
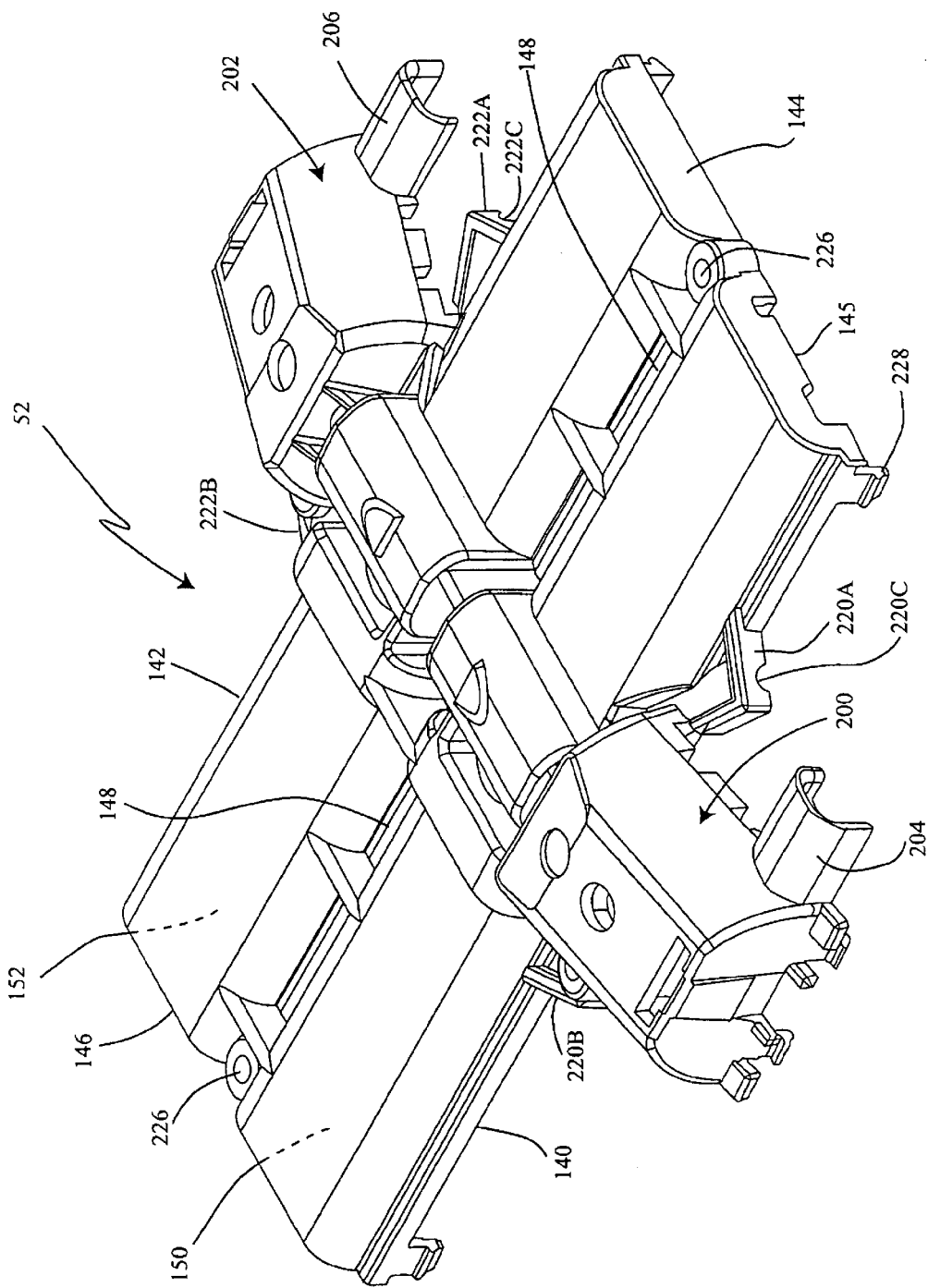
FIG. 6 is a perspective view of the mating upper housing.
Figure 7:
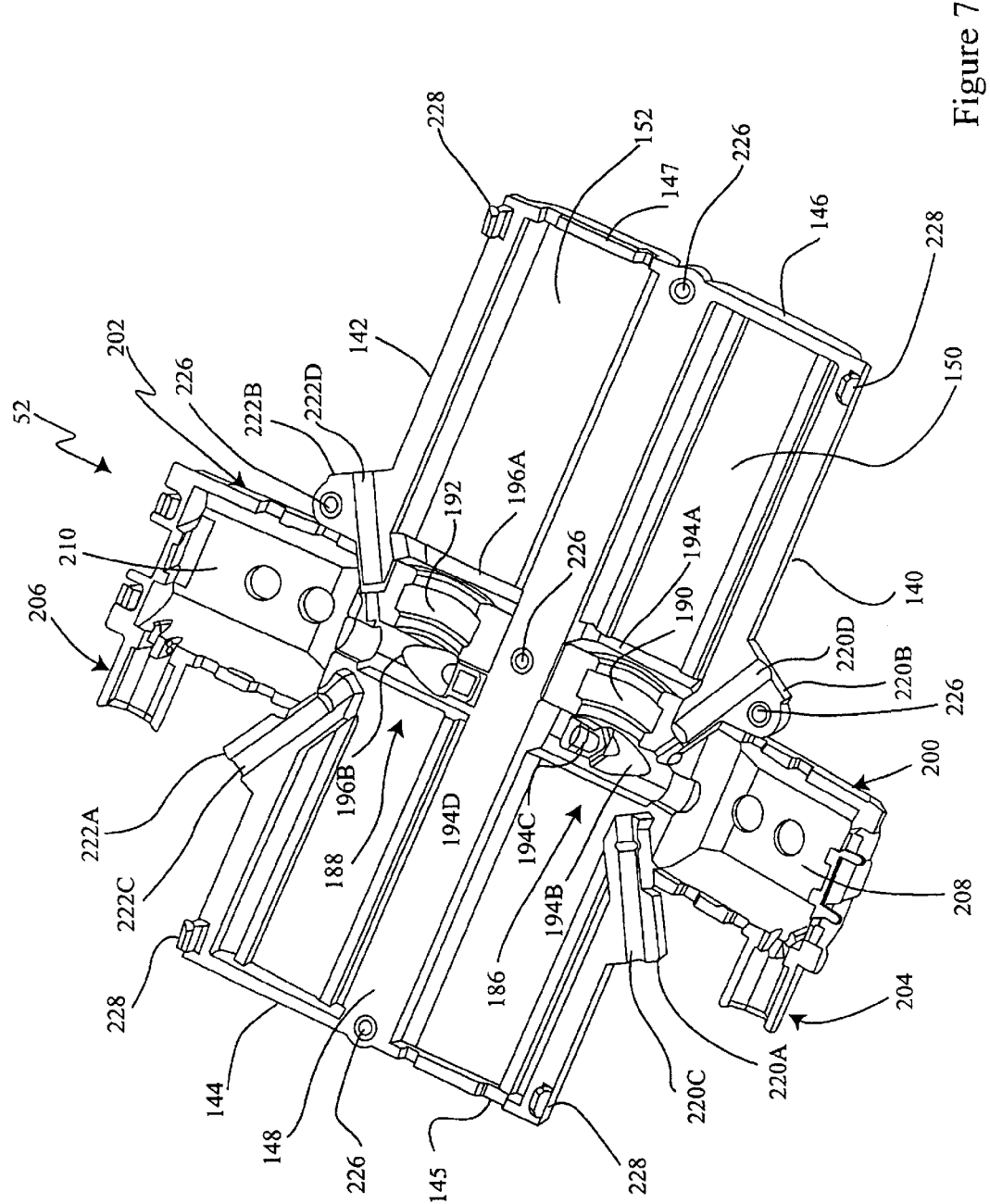
FIG. 7 is a perspective view of the inside of the mating upper housing.

With respect now to FIGS. 6 and 7, the upper housing 52 will be described in greater detail. Upper housing 52 is also preferably a molded plastic component and includes side margins 140 and 142 with end walls at 144 and 146. End wall 144 has an open channel at 145, and end wall 146 has an open channel at 147. A center wall 148 defines longitudinal compartment sections 150 and 152. With reference now to FIG. 7, compartment 152 includes bearing sections 186, 188 which complement bearing sections 86, 88, respectively. With respect now to FIG. 7, bearing section 186 of compartment 150 may now be viewed in detail. Bearing section 186 includes molded semi-cylindrical bearing section 190, which is flanked on either side by clearance slots 194A, 194B. In the same manner, bearing section 188 is comprised of molded semi-cylindrical bearing section 192, which is also flanked on both sides by clearance slots 196A, 196B. Clearance slot 194B leads into a bearing recess 194C, while clearance slot 196B leads into a bearing recess 194D, as described further herein. Upper housing 52 further includes motor-receiving sections 200 and 202, which include terminal connection sections 204, 206. Finally, platform extensions 220A and 220B flank motor-receiving section 200, and extensions 222A and 222B flank motor-receiving section 202. Extensions 220A, 220B have channels 220C, 220D, respectively, while extensions 222A and 222B have respective channels 222C and 222D. Upper housing section 52 further includes a plurality of through apertures 226 and latches 228.

With respect again to FIGS. 1, and 8–11, the remainder of the components will now be described in greater detail. With respect first to FIG. 1, support structure 6 includes vertical support sections 240 and 242 and a horizontal support section 244. It should be understood that the exact configuration of the support member 6 is not important, and it could be a separate item added together with the lumbar support mechanism, or could be a pre-existing support structure within the seat back itself.

Figure 10:
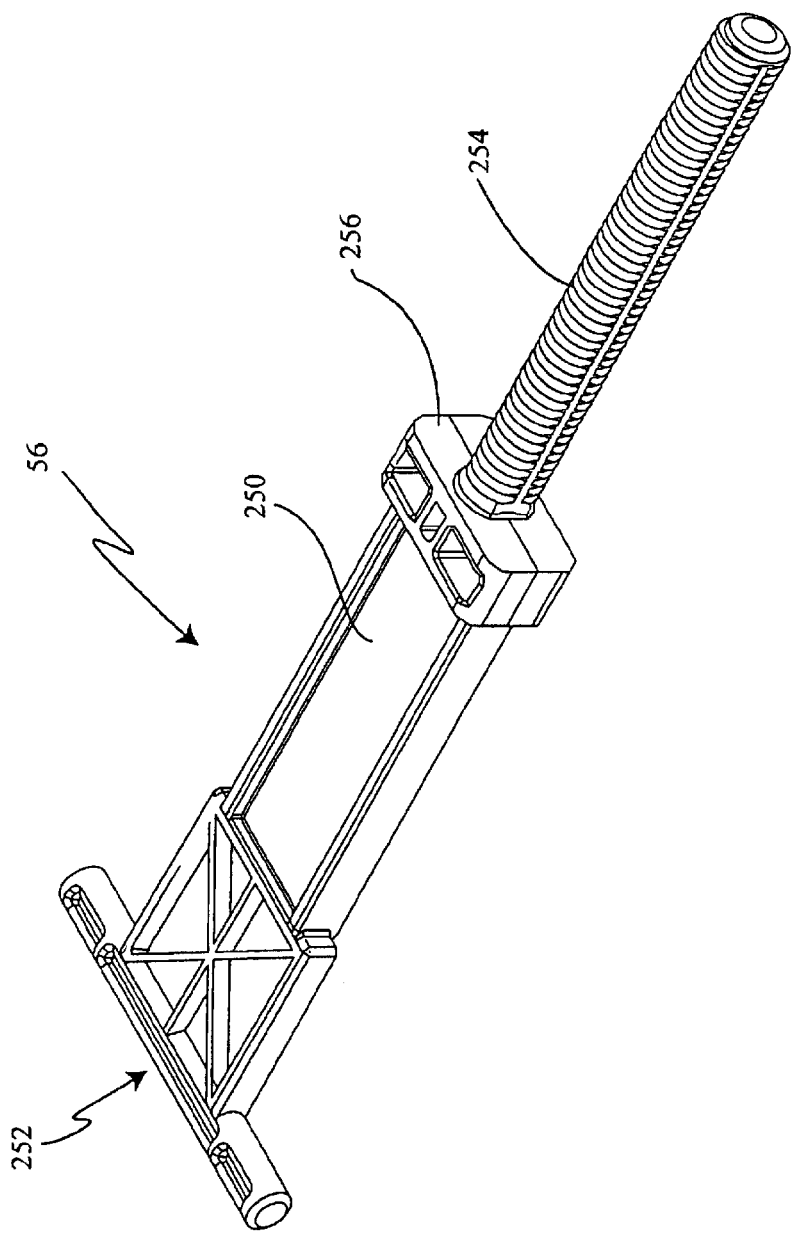
FIGS. 10 and 11 show perspective views of the threaded rods.
Figure 11:
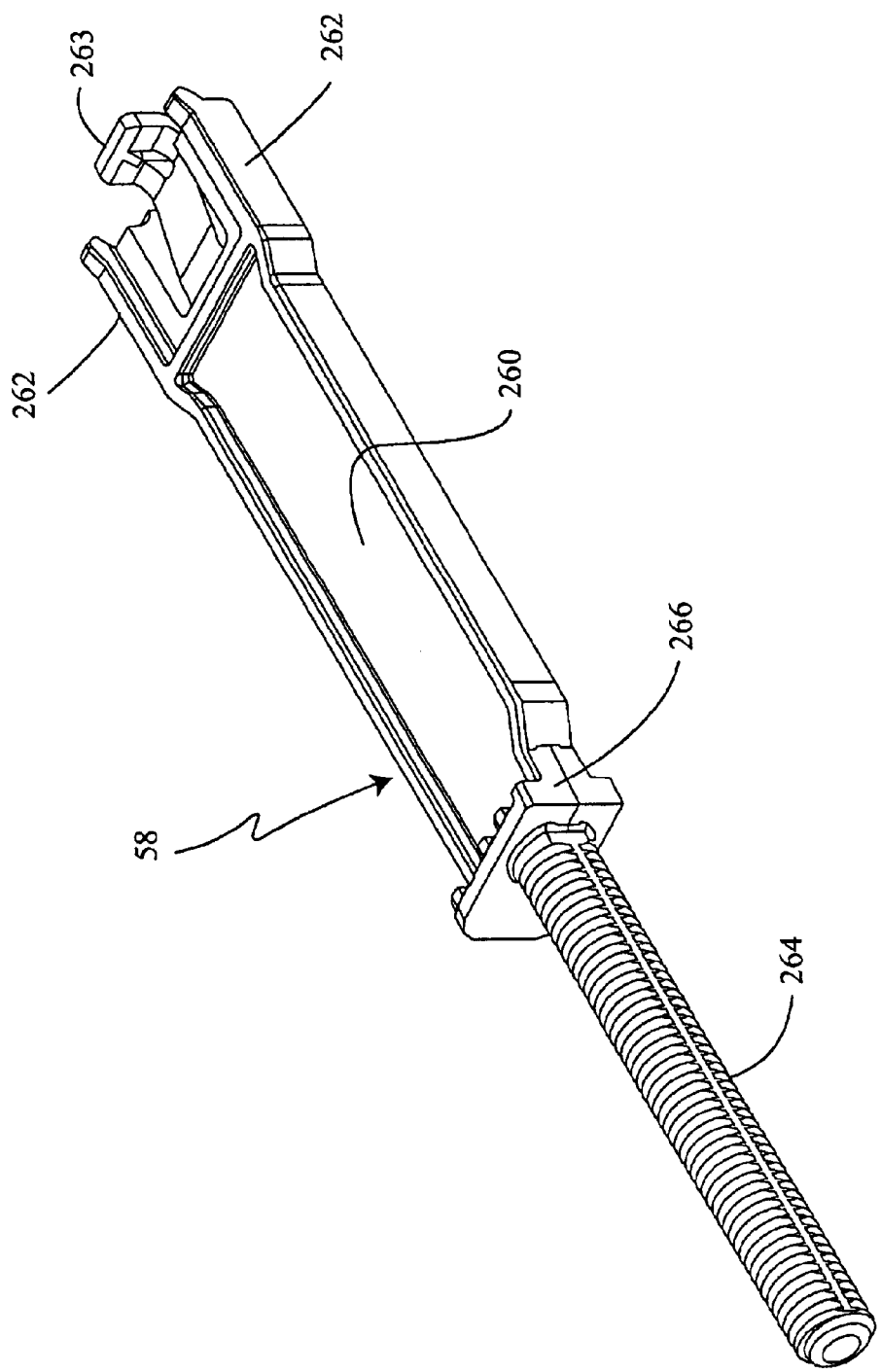
Figure 12:
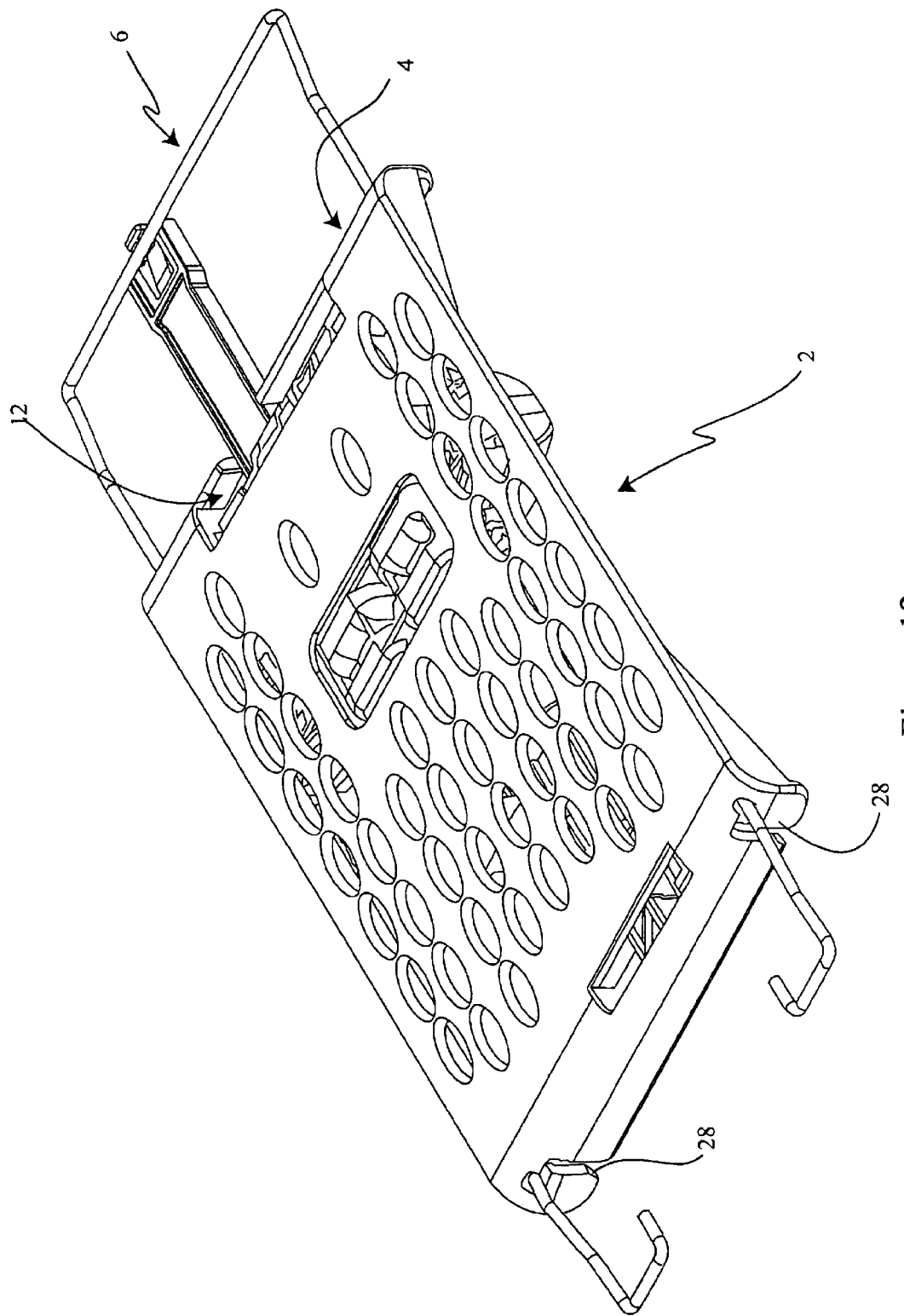
FIG. 12 shows a further completed view of the complete assembly.

With reference now to FIG. 10, movable connecting link 56 includes strap portion 250 having a T-shaped axle 252 at one end, and a threaded rod 254 at the opposite end, with an enlarged stop portion 256 therebetween. Movable connecting link 58 (FIG. 11) includes a strap portion 260 having connecting arms 262, 263 at one end and a threaded rod 264 at the opposite end, with an enlarged stop portion 266 therebetween. As shown in FIG. 1, arms 262, 263 are latched to horizontal support member 244.

Figure 8:
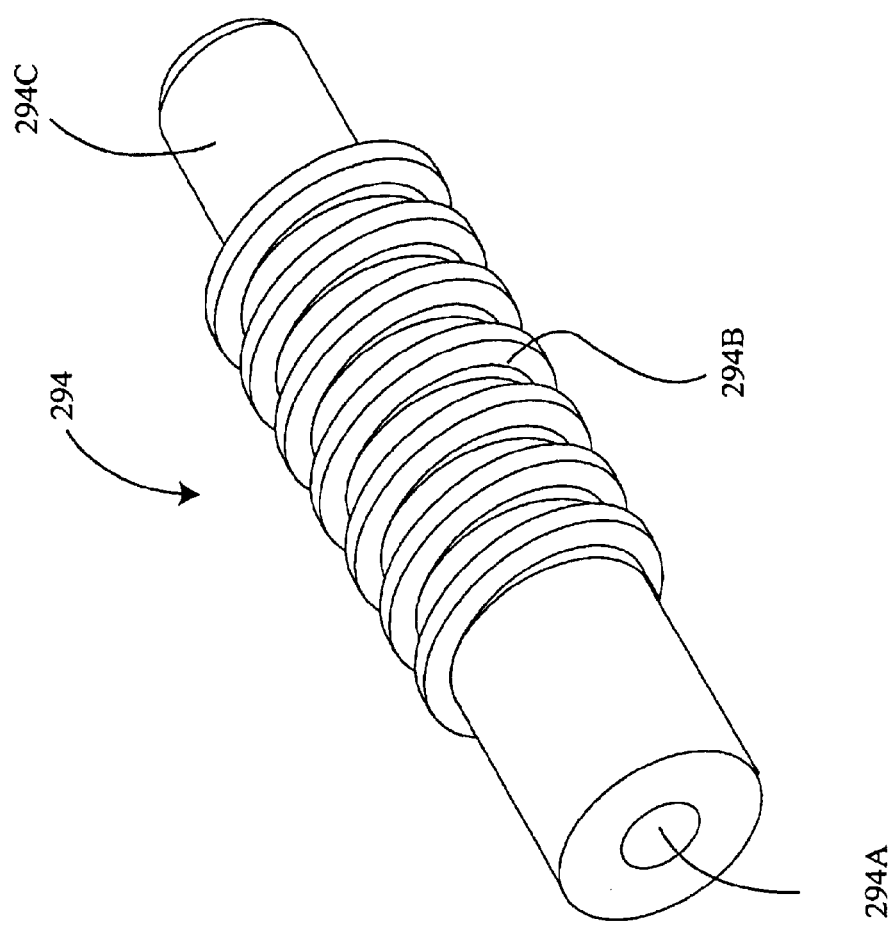
FIG. 8 is a perspective view of the worm.
Figure 9:
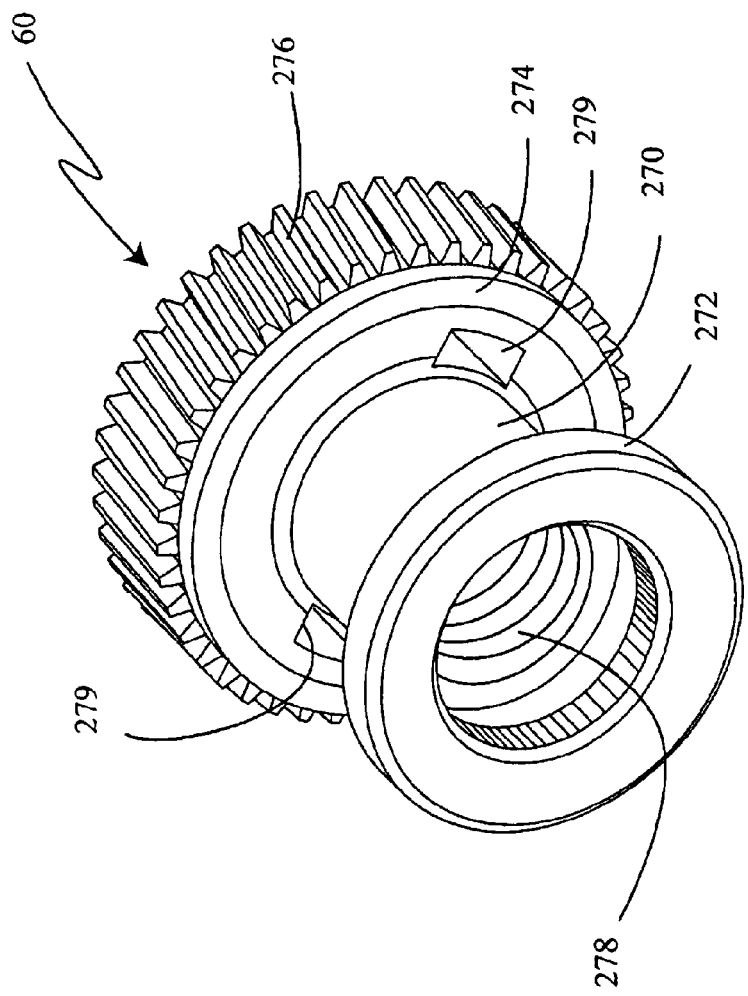
FIG. 9 is a perspective view of the worm gear.

With respect now to FIGS. 8–9, the drive mechanism for the movable links 56, 58 will now be described. As shown best in FIG. 9, gear nut 60 includes an intermediate bearing section 270 with collars 272 and 274 positioned on opposite sides thereof. Collar 274 further includes a gear portion 276 positioned thereon, which may be comprised of a different material as that of the collar 274. Worm gear 60 also includes internal threads 278 which threadably match the threads of threaded rod 254. Gear nut 60 also includes openings 279 which extend entirely through collar 274, as will be further described herein. Gear nut 62 (FIG. 1) is identical to gear nut 60 including collars 282, 284 and gear ring 286. Gear nut 62 includes internal threads 288 with a like thread as threaded rod 264.

As shown in FIG. 1, motor 66 includes a motor body 290 having an output shaft which drives a worm 294. As shown in FIG. 8, worm 294 includes an aperture 294A to receive the motor drive shaft, helical gear 294B and end section 294C. Likewise, motor 68 includes a motor body 296 with an output shaft which in turn drives worm 300.

With respect now to FIGS. 1 and 3, the assembly of the device will be described in further detail. The connecting links 56 and 58 are first partially threaded onto the respective gear nuts 60, 62, whereupon gear nut 60 can be positioned in its bearing-receiving section 188, and gear nut 62 is positioned in its bearing-receiving section 186, FIG. 7. This positions bearing section 270 (FIG. 9) in bearing section 192 (FIG. 7) with collars 272 and 274 in respective channels 196A and 196B. This also positions threaded rod section 254 (FIG. 10) in compartment 152 with strap section 250 positioned in open channel 147, of end walls 146. In a similar manner, gear nut 62 is positioned in its bearing-receiving section 186 with collars 282, 284 positioned in respective channels 194A and 194B. At this point, motor assemblies 66 and 68, including the respective worms 294 and 300, can now be installed within their respective extensions 202 200. Motor assembly 66 is positioned in extension 202 such that worm 294 is positioned with the helical gear 294B on worm 294 threadably engage with the cooperating teeth on gear portion 276. In a similar manner, motor assembly 68 is positioned in extension 200 with helical gear of worm 300 meshing with the teeth of ring gear 286.

Lower housing 54 (FIG. 5) may now be positioned over upper housing 52 such that the extensions 200 and 202 are aligned with respective extensions 100, 102. It should be appreciated that, when upper housing 52 is positioned on top of lower housing 54, each of the individual embossed openings 226 (FIG. 7) is aligned with respective openings 126 (FIG. 5), and individual latches 228 (FIG. 7) are aligned with the plurality of recesses 128 (FIG. 5). It should also be appreciated that the bearing sections 186, 188 are aligned with respective bearing sections 86, 88. Fasteners such as self-tapping screws are now positioned through openings 226 of the upper housing 52 to be threadably received into openings 126 to retain the two housing halves 52, 54 together.

It should be appreciated that, as assembled above, that is, with the upper and lower housings fastened together with respective side margins 70, 72 of lower housing 54 in contacting relation with respective side margins 140, 142 of upper housing 52, corresponding bearing sections 86, 186 and 88, 188 form a journal bearing for the gear nut 60, 62 to allow for their rotation therein. Furthermore, the compartments formed by respective compartment sections 80, 150 and 82, 152 are large enough to allow for the longitudinal movement of threaded rod sections 254 and 264, and respective stop members 256, 266. Finally, it should also be appreciated that strap section 250 is movable through the respective channel openings 77, 147 formed through end walls 76, 146; and that strap section 260 is movable through the respective channel openings 75, 145 formed through end walls 74, 144.

With the mechanism 8 assembled as described above, the mechanism 8 may now be applied to the lumbar plate 10 as follows. Axle 124 (FIG. 5) is first positioned through T-slot 42 (FIG. 3), and then axle 124 is positioned within trunnion 30. The axle section 252 (FIG. 10) is now positioned within its corresponding trunnion 32, whereupon the drive mechanism 8 is suspended between the end edges 18, 20. The assembled drive mechanism 8 and plate 4 may now be placed within the seat back, with the vertical assembled rods 240, 242 snapped in place within the associated openings 26, 28 and with the retaining sections 262, 263 snapped directly to the horizontal bar 244.

It should be appreciated then that the lumbar mechanism 2 is controllable to change both the convexity of plate member 4, as well as to move the vertical position of plate 4, relative to vertical bars 240, 242. When motor 66 is activated in a first direction, threaded rod 254 is threaded through the gear nut 60, with the threaded rod extending beyond gear nut 60. As the housing 50 is fixed to plate end 18 and as movable link 56 is connected to the opposite end 20, the concavity of the plate 4 is increased as the length between ends 18, 20 is decreased. It should be apparent that the plate is movable in the opposite sense as well. Furthermore, motor 68, when activated, causes the vertical movement of plate 4, relative to the vertical bars 240, 242.

With respect again to FIG. 2, it should be appreciated that when drive mechanism 8 is assembled, passage 300 is formed from the mating of channel 120D and channel 220D. Likewise, additional passageways (not shown) are formed from the mating of the channels 120C, 220C; 122C, 222C and 122D, 222D. All four passageways would provide an opening towards the gear portion 274 of the worm gears 60, 62, and particularly of openings 279, as they rotate.

Figure 13:
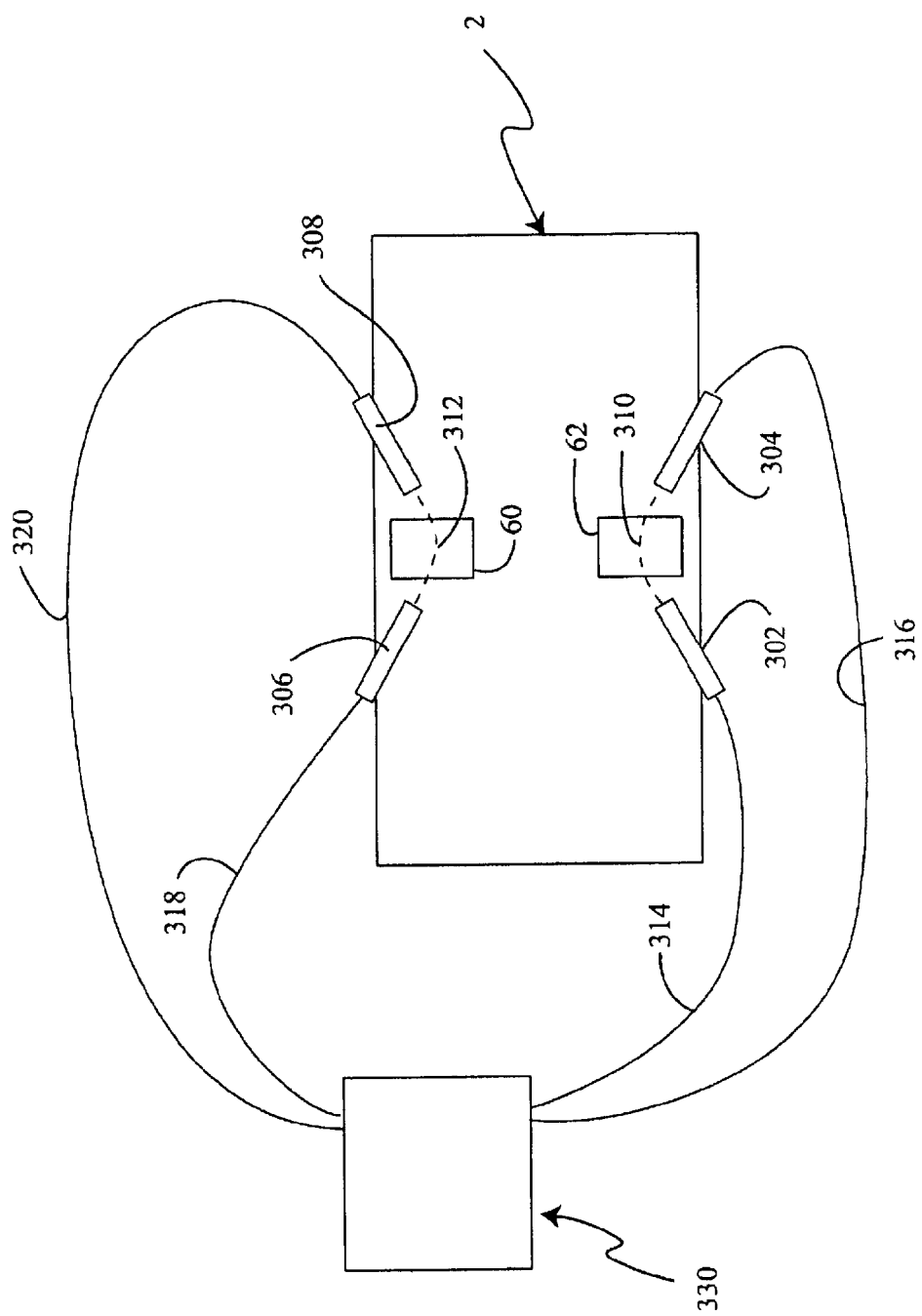
FIG. 13 shows a diagrammatical view of the control mechanism.

In the preferred embodiment of the invention, a laser counting device, such as emitters and detectors or other similar apparatus, are be affixed to or positioned, in these passages. As shown in FIG. 13, the assembly 2 is shown diagrammatically where emitter-detector pairs 302, 304; 306, 308 are positioned in the passageways, such as 300. The pairs are positioned such that the light is transmitted through apertures 279 which light is reflected at 310 and 312, as shown in FIG. 13. Each of the pairs 302, 304; 306, 308 have wire leads such as 314, 316; 318, 320 which are interconnected to control mechanism 330. Control mechanisms would include a counting mechanism (to count rotation of the gear nuts 60, 62, and memory to record the position of the vertical location, and convexity of the lumbar plate 4. Thus, it is common to have seat memory in automobiles to memorize the seat location for one or two drivers. This memory could also memorize the lumbar attributes for a number of drivers.

The memory device may then be connected to the motor controls in a manner known to one of ordinary skill in the art. This would allow a plurality of operators to store convexity and vertical positions of the plate member 4. Consequently, this could automatically adjust the convexity and vertical positions of the plate member 4 whenever a different operator utilizes the seat ensuring each operator has a combination of convexity and height that the operator has chosen as their preferred setting.

What is claimed is:

1. A powered lumbar mechanism comprised of a plate having an outer contact surface and an inner surface, side edges and end edges, a housing mechanism having an interior and opposite ends, said mechanism comprising;

a first connecting link being extendable from said housing and being in operative communication with a first end of the edge of said plate;

said housing being in operative communication with a second end edge of said plate;

a first motor in operative communication with said first connecting link such that operation of said motor mediates travel of said first connecting link such that said plate is deformable to a curvilinear shape of varying radii of curvature;

a second connecting link extendable from said housing and said second connecting link being attached in operative communication with a cross member of a mounting wire;

a second motor in operative driving communication with said second connecting link such that said second connecting link may mediate vertical travel of said plate along a first and second vertical portion of said mounting wire; and said operative communication of said first connecting link with said end edge of said plate and said attachment of said second connecting link with said cross member of said guide wire suspending said housing between said end edges of said plate.

2. The powered lumbar mechanism of claim 1, wherein said movable link has a drive end which extends through an opening in one end of the housing, and said power assembly comprises a cooperable drive mechanism positioned within said housing and in driving engagement with said drive end.

3. The powered lumbar mechanism of claim 2, wherein said drive end is comprised of a threaded rod.

4. The powered lumbar mechanism of claim 3, wherein said cooperable drive mechanism is comprised of an internally threaded worm gear, cooperatively threaded on said threaded rod.

5. The powered lumbar mechanism of claim 4, wherein said worm gear is further comprised of an externally geared section.

6. The powered lumbar mechanism of claim 5, wherein said power assembly is further comprised of a motor mounted to said housing, having a drive shaft and a drive gear cooperable with said externally geared section of said worm gear.

7. The powered lumbar mechanism of claim 6, wherein said drive gear is a worm.

8. The powered lumbar mechanism of claim 7, wherein said housing includes a plurality of passageways and an optical counting device, whereby said optical counting device measures a direction and a number of turns made by said worm gear.

9. The power lumbar mechanism of claim 8, further comprising a memory device connected to said optical counting device, whereby said memory device records said direction and said number of turns measured by said optical counting device.

10. The powered lumbar mechanism of claim 6, wherein said housing includes a motor mounting flange to mount said drive shaft and said drive gear, substantially transverse to said movable link.

11. The powered lumbar mechanism of claim 4, wherein said housing mechanism is comprised of bipartite housing halves, which together form said interior, said housing halves each including a molded bearing section, which form a bearing for rotatably mounting said worm gear thereon.

12. The powered lumbar mechanism of claim 1, wherein said other connecting link is fixed to said housing mechanism.

13. The powered lumbar mechanism of claim 12, wherein said plate includes trunnions at said end edges and said connecting links include rod ends receivable in said trunnions.

14. A powered lumbar mechanism for placement within a seat back, the lumbar mechanism comprising:

a plate mechanism having an outer contact surface and an inner surface, side edges and end edges;

a housing mechanism having a longitudinal interior compartment extending between opposite ends thereof, said housing mechanism being attached to a first end edge of said plate mechanism;

a movable connecting link movably attached to said housing mechanism, and comprising a drive end extending within said longitudinal interior compartment, and a connection end extending from said housing mechanism and connected to a second and opposite end edge of said plate mechanism; and a power drive mechanism, attached to said housing mechanism, and drivingly engaging said drive end, whereby said movable connecting link is longitudinally movable within said longitudinal interior compartment whereby said plate mechanism can define a curvilinear lumbar support plate within the seatback having varying radii of curvature; and wherein said housing mechanism includes side by side longitudinal interior compartments, and a second movable link is positioned within a second longitudinal interior compartment, said second movable connecting link comprising a drive end extending within said longitudinal interior compartment, and an opposite end extending from said housing and beyond an end edge of said plate; and a second power drive mechanism, attached to said housing, and drivingly engaging said drive end of said second movable connecting link, whereby said opposite end of said second movable connecting link can be attached to a fixed Point within said seatback, to move the location of the elate relative to the seatback.

15. The powered lumbar mechanism of claim 14, wherein said movable links extend from opposite ends of said housing.

16. The powered lumbar mechanism of claim 14, wherein said power drive mechanism comprises cooperable drive mechanisms positioned within said housing and in engagement with said drive ends of said movable links.

17. The powered lumbar mechanism of claim 16, wherein said drive ends are comprised of a threaded rod.

18. The powered lumbar mechanism of claim 17, wherein said cooperable drive mechanisms are comprised of internally threaded worm gears, cooperatively threaded on said threaded rods.

19. The powered lumbar mechanism of claim 18, wherein said worm gears further comprise externally geared sections.

20. The powered lumbar mechanism of claim 19, wherein said power drive mechanisms further comprise motors mounted said housing, having drive shafts and drive gears cooperable with said externally geared sections of said worm gears.

21. The powered lumbar mechanism of claim 20, wherein said drive gear is a worm.

22. The powered lumbar mechanism of claim 21, wherein said housing mechanism includes a motor mounting flange to mount said drive shaft and said drive gear, substantially transverse to said longitudinal interior compartment.

23. The power lumbar mechanism of claim 22, wherein said housing includes a plurality of passageways and an optical counting device, whereby said optical counting device measures a direction and a number of turns made by said worm gear.

24. The power lumbar mechanism of claim 23, further comprising a memory device connected to said optical counting device, whereby said memory device records said direction and said number of turns measured by said optical counting device.

25. The powered lumbar mechanism of claim 18, wherein said housing mechanism is comprised of bipartite housing halves, which together form said interior, said housing halves each including a molded bearing section, which form a bearing for rotatably mounting said worm gear thereon.

26. A seat assembly having powered lumbar adjustment within a seat back, the seat assembly comprising:

a seat, having a seat bottom and a seat back, the seat back having vertically extending rod members, and at least one horizontally extending support member; and a powered lumbar mechanism, comprising a curvilinear plate slidably attached to said vertically extending rod members, and a drive mechanism positioned between opposite vertical ends of said plate, said drive mechanism having a housing attached at a first vertical end of said plate and a movable link connected to said housing and connected to a second vertical end of said plate, and a power drive mechanism, attached to said housing and drivingly engaging said movable link, to move said movable link into and out of said housing;

whereby said power drive mechanism is operable to move said movable link to define said curvilinear plate within the seatback having varying radii of curvature;

wherein said movable link is movably attached to said housing, and comprises a drive end extending within a first longitudinal interior compartment of said housing mechanism; and further wherein said housing includes side by side longitudinal interior compartments, and a second movable link is positioned within a second longitudinal interior compartment, said second movable connecting link comprising a drive end extending within said second longitudinal interior compartment, and an opposite end extending from said housing, beyond an end edge of said plate, and attached to said horizontally extending support member; and a second power drive mechanism, attached to said housing, and drivingly engaging said drive end of said second movable connecting link, whereby said second power drive mechanism can be actuated to move the vertical location of the plate relative to the seatback.

27. The powered lumbar mechanism of claim 26, wherein said movable links extend from opposite ends of said housing.

28. The powered lumbar mechanism of claim 27, wherein said first and second power drive mechanisms comprise cooperable drive mechanisms positioned within said housing and in engagement with said drive ends of said movable links.

29. The powered lumbar mechanism of claim 28, wherein said drive ends are comprised of threaded rods.

30. The powered lumbar mechanism of claim 29, wherein said cooperable drive mechanisms are comprised of internally threaded worm gears, cooperatively threaded on said threaded rods.

31. The powered lumbar mechanism of claim 30, wherein said worm gears further comprise externally geared sections.

32. The powered lumbar mechanism of claim 31, wherein said first and second power drive mechanisms further comprise motors mounted to said housing, having drive shafts and drive gears cooperable with said externally geared sections of said worm gears.

33. The powered lumbar mechanism of claim 32, wherein said drive gears are worms.

34. The powered lumbar mechanism of claim 33, wherein said housing includes motor mounting flanges to mount said drive shafts and said drive gears, substantially transverse to said first and second longitudinal interior compartments.

35. The powered lumbar mechanism of claim 34, wherein said housing is comprised of bipartite housing halves, which together form said interior, said housing halves each including molded bearing sections, which form bearings for rotatably mounting said worm gears therein.

36. The power lumbar mechanism of claim 35, wherein said housing includes a plurality of passageways and an optical counting device, whereby said optical counting device measures a direction and a number of turns made by said worm gear.

37. The power lumbar mechanism of claim 36, further comprising a memory device connected to said optical counting device, whereby said memory device records said direction and said number of turns measured by said optical counting device.

38. A power lumbar mechanism comprising a lumbar plate deformable to various convex positions, a drive mechanism extending between opposite ends of said lumbar plate, and having various longitudinal positions to vary the lumbar plate convexity, said drive mechanism comprised of a motor unit, a drive nut, and a threaded rod, and further comprising a sensing mechanism to count the number of rotations of said drive nut, in order that exact positioning is known.

39. The power lumbar of claim 38, wherein said drive unit is further comprised of a worm driven by said motor, and said worm in turn driving said drive nut, said drive nut having internal threads which threadably engage said threaded rod to drive said rod, to extend and retract said rod, and thereby change the convexity of said lumbar plate.

40. The power lumbar mechanism of claim 39, wherein said sensing unit is comprised of a light emitting member and a light detecting member.

41. The power lumbar mechanism of claim 40, wherein said drive nut includes at least one aperture therethrough, and said light emitting member and said light detecting member are positioned on opposites sides of said aperture, to emit light and receive light, through said apertures, whereby the rotational movement of said drive nut can be counted.

42. The power lumbar mechanism of claim 41, further comprising a memory means to memorize the position of said drive nut.

* * * * *

UNITED STATES PATENT AND TRADEMARK OFFICE
CERTIFICATE OF CORRECTION

PATENT NO. : 6,938,955 B2
DATED : September 6, 2005
INVENTOR(S) : VanSickle

It is certified that error appears in the above-identified patent and that said Letters Patent is hereby corrected as shown below:

Column 9,
Line 65, reads "to a fixed Point" should read -- to a fixed point --.

Column 12,
Line 19, reads "mechanism to count the" should read -- mechanism that counts the --.

Signed and Sealed this

First Day of November, 2005

JON W. DUDAS
*Director of the United States Patent and Trademark Office*